(12) United States Patent
Sommerer

(10) Patent No.: US 7,818,382 B2
(45) Date of Patent: *Oct. 19, 2010

(54) METHOD AND SYSTEM FOR AUTOMATICALLY UPDATING CONTACT INFORMATION WITHIN A CONTACT DATABASE

(75) Inventor: Peter Sommerer, Kanata (CA)

(73) Assignee: MyLife.com, Inc., Los Angeles, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/636,498

(22) Filed: Dec. 11, 2006

(65) Prior Publication Data

US 2007/0150542 A1 Jun. 28, 2007

Related U.S. Application Data

(62) Division of application No. 10/773,958, filed on Feb. 9, 2004, now Pat. No. 7,149,782, which is a division of application No. 09/741,828, filed on Dec. 22, 2000, now Pat. No. 6,701,348.

(51) Int. Cl.
*G06F 13/00* (2006.01)

(52) U.S. Cl. ........................ 709/206; 709/219; 709/223

(58) Field of Classification Search ................. 709/206, 709/217, 219, 223; 707/10
See application file for complete search history.

(56) References Cited

U.S. PATENT DOCUMENTS

| | | | |
|---|---|---|---|
| 5,559,867 A | 9/1996 | Langsenkamp et al. | |
| 5,737,726 A | 4/1998 | Cameron et al. | |
| 5,740,230 A | 4/1998 | Vaudreuil | |
| 5,903,845 A | 5/1999 | Buhrmann et al. | |
| 5,933,778 A | 8/1999 | Buhrmann et al. | |
| 5,999,932 A | 12/1999 | Paul | |
| 6,009,149 A | 12/1999 | Langsenkamp | |
| 6,185,551 B1 | 2/2001 | Birrell et al. | |
| 6,195,686 B1 | 2/2001 | Moon et al. | |
| 6,247,043 B1 * | 6/2001 | Bates et al. ................. | 709/200 |
| 6,249,805 B1 | 6/2001 | Fleming, III | |
| 6,374,259 B1 | 4/2002 | Celik | |
| 6,389,455 B1 | 5/2002 | Fuisz | |

(Continued)

FOREIGN PATENT DOCUMENTS

EP 0927945 A2 11/1999

(Continued)

OTHER PUBLICATIONS

Nahabedian et al., "Diagnosing Delivery Problems in the White House Information-Distribution System", AI Magazine, Winter 1996, American Assoc. Artificial Intelligence, vol. 17, No. 4, pp. 21-30, XP002231328, USA , 1996.

(Continued)

*Primary Examiner*—Viet Vu
(74) *Attorney, Agent, or Firm*—Freedman & Associates

(57) ABSTRACT

A method is proposed for automatically updating and maintaining contact information for various contacts stored in a contact database without requiring an individual to manually update their contacts by using an automated reply process for the maintaining of contact information, as well as only requiring one individual to be a member of the service. Updating of the contacts with the automated reply process installed is more frequent.

16 Claims, 8 Drawing Sheets

U.S. PATENT DOCUMENTS

| | | | |
|---|---|---|---|
| 6,405,243 B1* | 6/2002 | Nielsen | 709/206 |
| 6,457,012 B1 | 9/2002 | Jatkowski | |
| 6,546,416 B1 | 4/2003 | Kirsch | |
| 6,564,264 B1 | 5/2003 | Creswell et al. | |
| 6,615,241 B1 | 9/2003 | Miller et al. | |
| 6,694,353 B2 | 2/2004 | Sommerer | |
| 6,760,727 B1 | 7/2004 | Schroeder et al. | |
| 6,791,050 B2 | 9/2004 | Daniels, Jr. et al. | |
| 6,829,348 B1 | 12/2004 | Schroeder et al. | |
| 6,839,737 B1 | 1/2005 | Friskel | |
| 6,883,000 B1 | 4/2005 | Gropper | |
| 6,980,870 B1* | 12/2005 | Mok et al. | 700/90 |
| 2001/0032089 A1 | 10/2001 | Schiller | |
| 2002/0007400 A1 | 1/2002 | Pederson | |
| 2002/0010747 A1 | 1/2002 | Jaehyuk-Hwang | |
| 2002/0016857 A1 | 2/2002 | Harari | |
| 2002/0052841 A1 | 5/2002 | Guthrie et al. | |
| 2002/0052921 A1 | 5/2002 | Morkel | |
| 2002/0103932 A1 | 8/2002 | Bilbrey et al. | |
| 2002/0107925 A1 | 8/2002 | Goldschneider et al. | |
| 2002/0124057 A1 | 9/2002 | Besprosvan | |
| 2002/0169748 A1 | 11/2002 | Macholda | |
| 2002/0198942 A1 | 12/2002 | Ryan | |
| 2003/0158860 A1 | 8/2003 | Caughey | |
| 2003/0212745 A1 | 11/2003 | Caughey | |
| 2004/0015554 A1 | 1/2004 | Wilson | |
| 2004/0039779 A1 | 2/2004 | Armstrong et al. | |
| 2004/0054734 A1 | 3/2004 | Gilbert | |
| 2005/0010799 A1 | 1/2005 | Kelley et al. | |
| 2005/0060638 A1 | 3/2005 | Mathew et al. | |

FOREIGN PATENT DOCUMENTS

| | | |
|---|---|---|
| JP | 11041275 | 2/1999 |
| JP | 2000066971 | 3/2000 |
| WO | WO 00/67105 A1 | 11/2000 |
| WO | WO 00/67108 A1 | 11/2000 |
| WO | WO 00/67416 A2 | 11/2000 |
| WO | WO 01/06497 A2 | 1/2001 |
| WO | WO 01/33430 A1 | 5/2001 |
| WO | WO 01/59595 A2 | 8/2001 |

OTHER PUBLICATIONS

Robert J. Hall "INFOMOD: a knowledge-based moderator for electronic mail help lists", conference on information and knowledge management proceedings of the fifth international conference on information and knowledge management, pp. 107-114, 1996.

GoodContacts.com Inc., GoodContacts: How it Works, Sep. 24, 2001, GoodContacts.com.

GoodContacts.com Inc., GoodContacts: Questions and Answers, Sep. 24, 2001, GoodContacts.com.

* cited by examiner

250

| First Name | Middle Initial | Last Name |
|---|---|---|
| 211 | 212 | 213 |

Address Line

| 214 |
|---|

| City | State / Province |
|---|---|
| 215 | 216 |

| Zip or Postal Code | Country |
|---|---|
| 217 | 218 |

| Phone | Fax |
|---|---|
| 219 | 220 |

Fig. 2B

METHOD AND SYSTEM FOR AUTOMATICALLY UPDATING CONTACT INFORMATION WITHIN A CONTACT DATABASE

This application claims priority from U.S. patent application Ser. No. 10/773,958 filed Feb. 9, 2004, now U.S. Pat. No. 7,149,782 which in turn claims priority from U.S. patent application Ser. No. 09/741,828 filed Dec. 22, 2000 (now issued to U.S. Pat. No. 6,701,348).

FIELD OF THE INVENTION

This invention relates to a method of updating, maintaining and verifying contact information for various contacts held in a database and more particularly to an automated method of maintaining the contact information fields within a contact database without requiring an individual to manually update same.

BACKGROUND OF THE INVENTION

In the past, people have maintained contact lists on paper. The proverbial "black book" is a good example of a list of individuals and their contact information. Unfortunately, it is not uncommon that upon attempting to contact someone one discovers that the information is no longer accurate. This is of tremendous inconvenience, especially during emergency or time limited situations. Unfortunately, the task of maintaining a large contact list current is often too onerous for the few times one needs to contact each individual.

Therefore, whenever someone changes address, phone numbers or any other piece of contact information, there is a necessity for them to provide their contacts with the most current contact data. Conventional methods of accomplishing this task include sending updated information by email, via facsimile, or even by telephoning to contacts in an address book and making others aware that some information has changed and they need to manually update their contact list, which is time consuming.

A service offering automated updating of electronic contact information and ensuring most current contact information is offered by PeopleStreet through their World Wide Web site PeopleStreet.com. PeopleStreet addresses the difficult task of enabling people to stay connected to their many circles of contacts. The service provided by PeopleStreet manages the personal information and provides a dynamic link to all personal and professional relationships. This is performed by providing a method for each user to update their own address book entry, thereby automatically updating all the other user contacts of their new address book entry, wherever they may be.

Although the service that PeopleStreet provides does automate this tedious process, it does require that each party is a member of the service. In this manner information is updated from and to all parties subscribed to the service. This facilitates updating your personal information and being updated of others. A shortcoming of the method is that members of the address book, which are not already subscribed, still have to manually inform the subscribed user of their updated contact information according to the prior art updating method.

Contact.com also offers a similar type of contact service, which provides for the exchange of personal information. Once again, subscribed users decide which of their contacts are privileged to which information fields and as a result when the contact changes their personal information all the other address books linked to the contact are updated. This form of service requires the information to be stored on a central storage system. Although security may be strictly enforced, there are still security concerns because all personal information is accessible from outside the server.

It would be highly advantageous to provide a method for updating contact information in an automated fashion absent either security concerns or mandatory subscription to a service by each party within a given contact list.

SUMMARY OF THE INVENTION

The present invention seeks to automate the task of maintaining an up to date electronic contact address book. Advantageously the invention only requires membership by one user, enabling them to have their contact information automatically maintained. Provisions are made for an optionally installed program on the contact computer system allowing for the automatic maintenance of contact request messages sent from the user to the contacts such that contacts do not feel bombarded by the periodic messages sent by the user to ascertain the validity of the contact information.

BRIEF DESCRIPTION OF THE DRAWINGS

Exemplary embodiments of the invention will now be described in conjunction with the following drawings, in which:

FIG. 2B shows the typical known boxes for different contact information entry.

DETAILED DESCRIPTION OF THE INVENTION

Generally, according to the invention a method is provided for communicating between at least two parties for the exchange of personal contact information in such a manner that only one party is actively subscribed to the service and such that all of their electronic contact information is automatically updated. Thus, the need for split contact lists—those who are subscribed and those who are not—is obviated.

Figure 1:
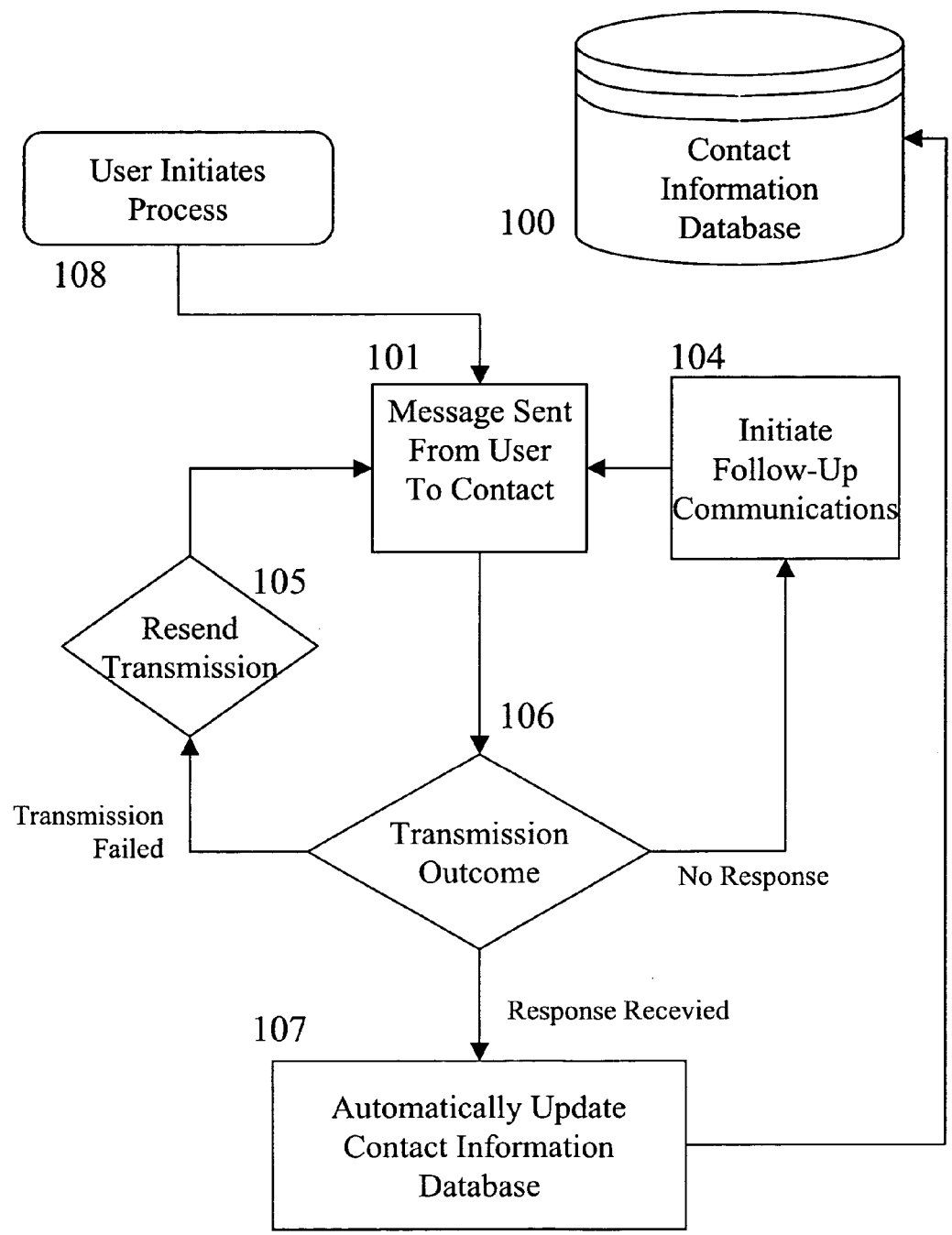
FIG. 1 presents a simplified exemplary flow diagram of a method according to the invention for updating contact information stored in an electronic form.

Referring to FIG. 1, a simplified flow diagram of a method according to the invention for updating contact information stored in an electronic form as a contact management database 100 is shown. For example, a contact list is stored within a personal digital assistant in the form of an address, phone and email contact list. Typically, such a list is both portable and conveniently accessible. Convenient access includes the ability to search and group contacts within the list.

In order to update the contact list, the method is initiated at step 108 by at least one user, referred to as "the user." The address book set-up by the user typically contains the contact information of all the contacts with which the user wishes to communicate. Preferably, the contents of the user's address book reside with the user, without having copies of personal data or the personal data of others being stored on a central server.

Upon initiating the method, a message is transmitted at step 101 to each individual within the contact list requesting updated contact information. Typically, the message includes current contact information for the recipient in order to allow the recipient to indicate that no change has occurred. There are a number of possible outcomes to the step of transmission detailed above resulting in contacts classified into three groupings; valid contacts, suspect contacts and invalid contacts, as will be described in the three cases below. The outcome of the transmission being determined analysis step 106.

First, the transmission may fail, as shown by "Transmission Failed" outcome from the analysis step 106. Preferably, the transmission is resent at step 105 to verify that the failure was not caused by a temporary problem. Upon determining that the failure was not caused by a temporary system problem through a predetermined number transmission resends, the contact is noted as invalid since it is evident that the contact information used is no longer current.

Second, the transmission is not responded to, as shown by "No Response" outcome from the analysis step 106. From analysis step 106 the process proceeds then to step 104 and initiates follow-up communications which involves a repeated contact attempt, thereby returning the process to step 101. After several contact attempts, and the transmission does not appear to fail, in which case it is assumed that the contact information is correct. After a predetermined number of communication cycles, involving steps 101, 106 and 104, for which no response from the contact is noted.

Third, the transmission is responded to, as indicated by the "Response Received" outcome from the analysis step 106. This response can be either an indication that the contact information is unchanged, or that it has changed. This type of contact is noted as a valid contact and the contact information changes are automatically entered at step 107 within the contact list stored within the contact information database 100.

Typically, the step of automatically entering the updated contact information involves parsing the response to determine contact information therein. Once the contact information is determined, it is compared to current contact information allowing the changes to be detected and then, the changes are implemented. Of course, when the response is in a known format, the step of comparing the contact information is obviated.

Advantageously, the contact information is only updated when the user requests an update, and as such, the user's information is not changed without their knowledge.

Figure 2A:
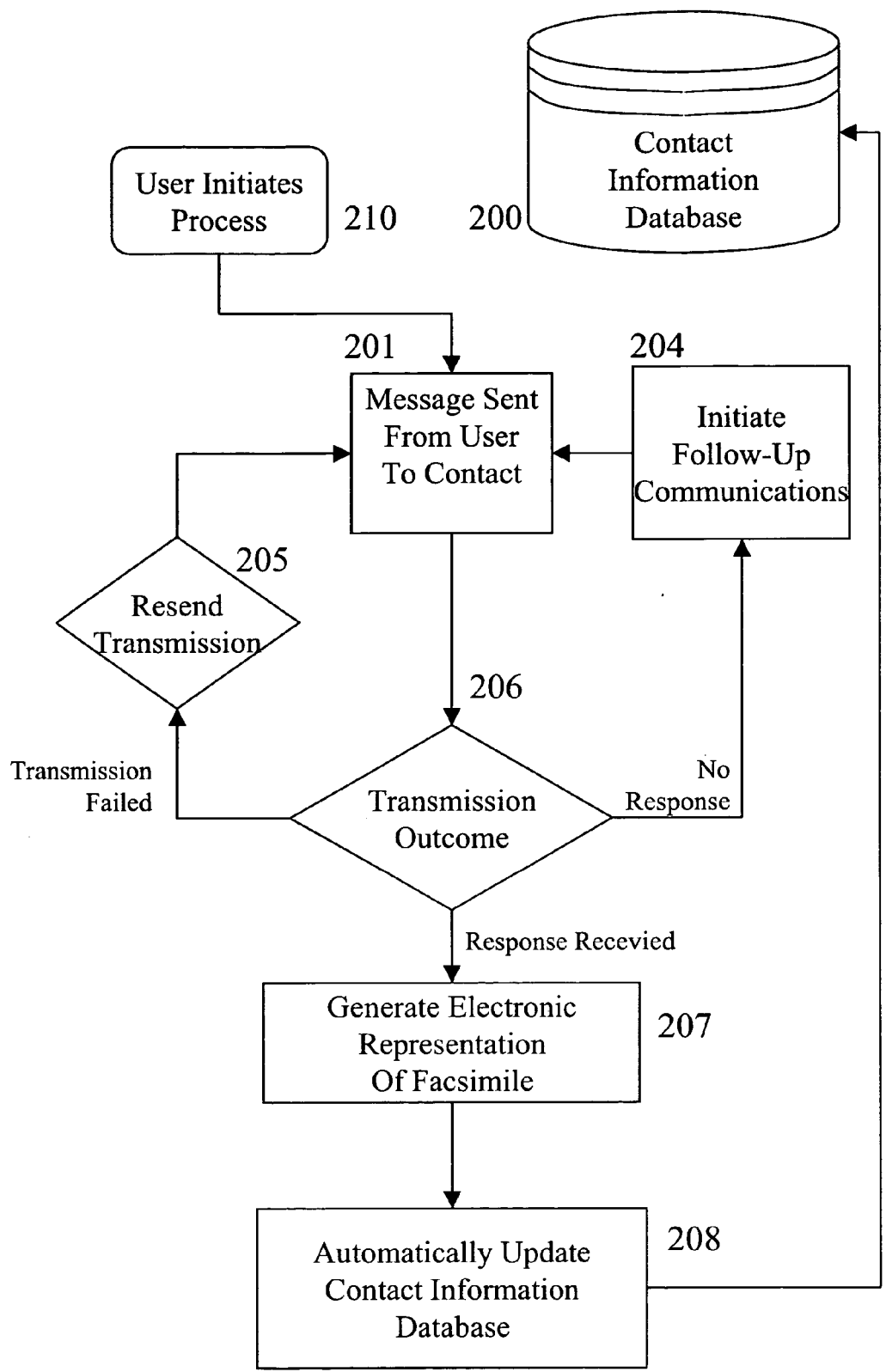
FIG. 2A presents another exemplary flow diagram according to embodiment of the invention where the method for updating contact information stored in an electronic form

In FIG. 2A another embodiment of the invention is disclosed where the method for updating contact information stored in an electronic form is shown. Upon initiating the method, step 210, a message is transmitted to each individual within the contact list in step 201 requesting updated contact information by facsimile. Typically, the message includes current contact information for the recipient in order to allow the recipient to indicate that no change has occurred.

There are a number of possible outcomes to the step of transmission 201 detailed above, the determination of which occurring at analysis step 206. However the one of primary concern is the receipt of a reply, in the case of a valid contact. This being denoted as the "Response Received" outcome from the analysis step 206. The reply in this exemplary flowchart being a facsimile message. In order to update the user contact list an electronic representation of this facsimile message is produced in the form of an electronic image of the facsimile document is generated at step 207. This electronic representation is automatically parsed to detect contact information therein at step 208 which is then automatically entered in appropriate fields in the user's contact list portion of the contact information database 200.

Typically after sending of an electronic facsimile message a reply is generated by the receiving system indicative of a successful transmission. However in some cases no form of reply is received from the contact system and the success of the transmission cannot be verified. As a result after some prescribed amount of time the facsimile message is resent to verify the contact information. If after a specified number of facsimile transmission attempts there is still no indication of a successful transmission from the contact system the contact is noted as suspect.

If an error reply is received from the contact system after transmission of an update request message, the message is resent to make sure the error was not caused by a system problem. After a predetermined number of unsuccessful contact attempts the contact is noted as invalid.

For example, a form 250 such as that shown in FIG. 2B, is used with entry boxes 211 through 220 indicated for different contact information. As shown the form 250 comprises entry boxes "First Name" 211, "Middle Initial" 212, and "Surname" 213 allowing the user to enter their name into the form 250. Next the form 250 comprises "Address Line" 214, "City" 215, "State/Province" 216, "Zip or Postal Code" 217, "Country" 218 relating to the address of the user who's name was entered into the name fields 211 to 213. Parsing of these manually entered data in specific boxes is well known in the art. Finally, the user enters their phone number into the field "Phone" 219 and fax number into the "Fax" 220.

Figure 3A:
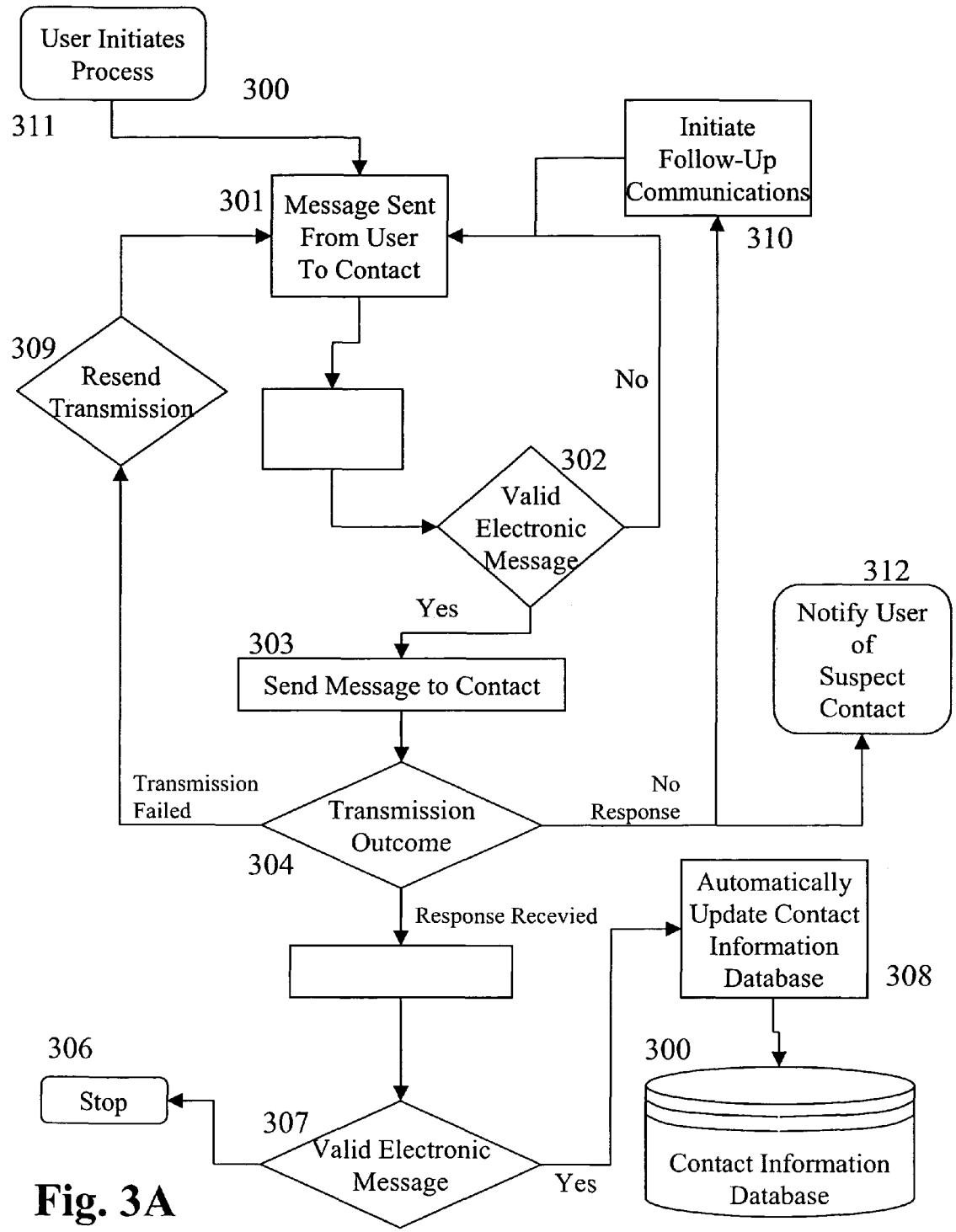
FIG. 3A presents a simplified exemplary flow diagram according to an embodiment of the invention wherein the transmission medium is the Internet.

Referring to FIG. 3A, a simplified flow diagram is shown wherein the transmission medium is the Internet. In order to update the contact list, a user initiates the method in step 311. Upon initiating the method, an electronic message is transmitted to the electronic address of each contact stored within a contact list in process 301. Once the electronic message is received on the contact system the message is verified, at step 302, before further action. Typically, the electronic message includes a subject line indicating a request for contact information update as well as current contact information for the recipient in order to allow the recipient to indicate for convenience that no change has occurred when this is the case. Once verified the valid electronic message is sent to the user in step 303. There are a number of possible responses the user system may receive and each is detailed below, based upon the determination made in analysis step 304.

A first possible response is as follows: the transmission may fail and result in an undeliverable electronic message, represented by the outcome "Transmission Failed". In these cases, it is generally evident from the electronic message received back that either the contact information used is no longer current or the failed message delivery was caused by a temporary system or network problem. Preferably, when a delivery error occurs the electronic message is re-sent, step 309, to verify that the failure was not caused by a temporary problem. Upon determining that the failure was not caused by a temporary system problem, for example by executing a predetermined number of transmission resends, the contact is noted as invalid since it is evident that the contact information used is no longer current.

A second possible response is as follows: the transmission is not responded to but no electronic message delivery failure is noted, in which case it is assumed that the contact information has been received and is correct. Such an outcome being denoted by "No Response". Of course, this is not necessarily the case, and optionally for important contacts, a follow up communication is initiated in step 310 to verify the information. Preferably, a request for client contact is provided after a predetermined number of consecutive occurrences of this possible response from a same contact. Optionally, such requests include information relating to a previous attempt and indicating that no response had been received. As such the "No Response" outcome returns from step 310 to the sending of a message to the contact 301, although now the content of the message is adjusted to reflect the current position as indicated supra.

Typically in the second case there is no reply received from the contact within some predetermined time period. Perhaps the contact has no method of automatically replying to the electronic message, an error has occurred during transmission, the messages have been filtered by a "spam" or content filter, or they have simply missed the message amongst their general electronic messages. After a predetermined number of communications wherein no response from the contact occurs the contact is noted as being suspect and an indication is provided to the user to take different action and determine the problem with this contact information, step 312. Preferably, the indication is generated only after a predetermined number of contact list update attempts with no response. This allows the above noted assumption that the contact information is correct to be verified at intervals when no other data is received from the contact.

In the third case a response to the transmitted electronic message is received, as indicated by "Response Received". The response, in this exemplary embodiment is transmitted electronically from the contact to an electronic address of the user. Accordingly, the received message is parsed in process 307 for validity, and as this message is received from a known contact it is noted as valid or not. An invalid response results in this exemplary flow with the process moving to step 306 and stopping. For a valid contact the process moves to step 308 wherein the message is interpreted and when contact information within the message has changed, the user system automatically updates the contact list with the changes into the contact information database 300.

Figure 3B:
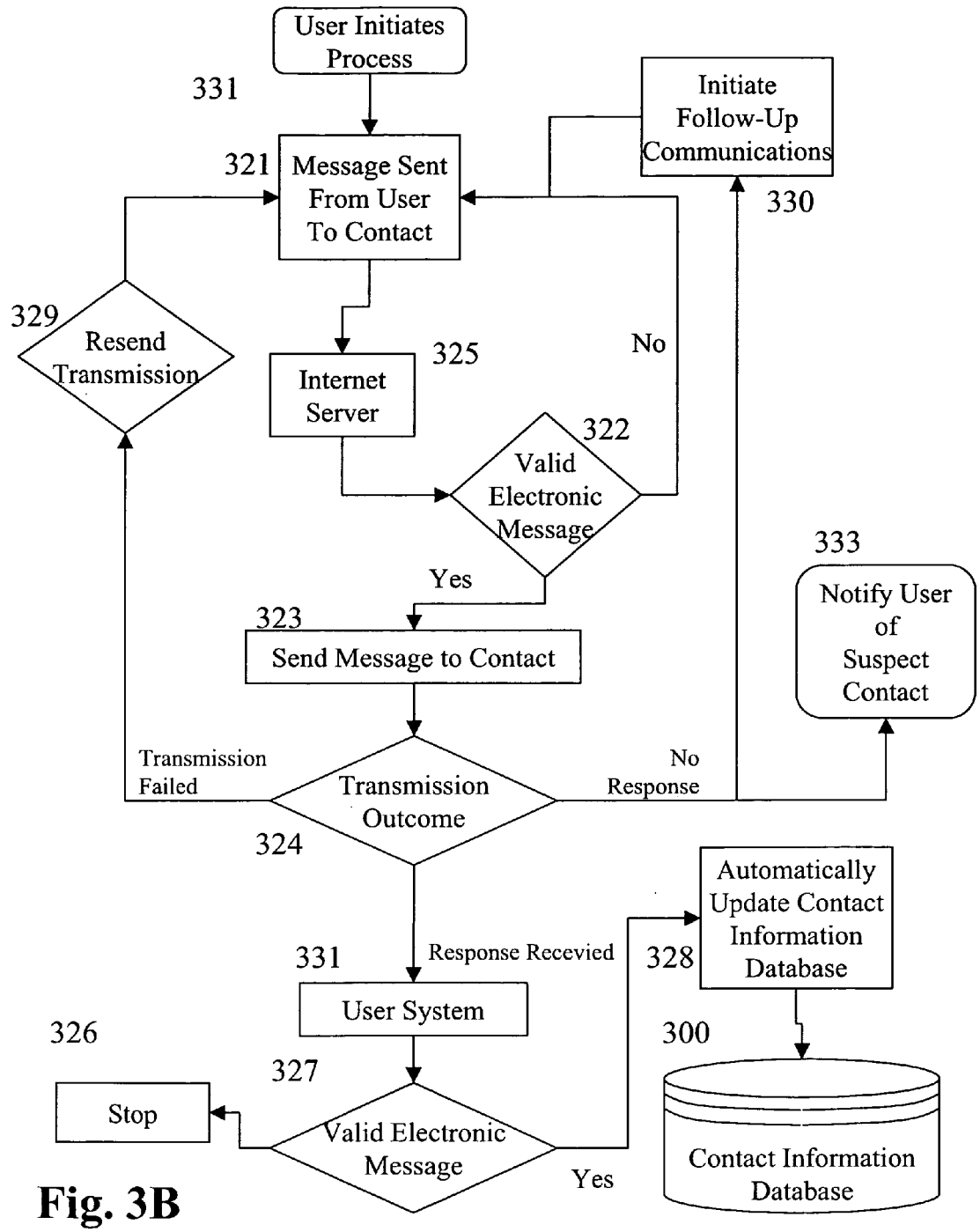
FIG. 3B simplified exemplary flow diagram according to an embodiment of the invention wherein the transmission medium is the Internet and communication between a user and a contact takes place via an Internet server.

Referring to FIG. 3B, a flow diagram is shown wherein the transmission medium is the Internet and communication between a user and a contact takes place via an Internet server. In order to update the contact list, a user initiates the method at step 331. Upon initiating the method, an electronic message is generated and sent in step 321, to an Internet server that receives the electronic message in step 325. The Internet server authenticates the electronic message in step 322 before further action is taken. If verified, the server commences a process for updating the contact list information. In the first step 323 the server transmits a message to each electronic address of contacts within the contact list. Typically, the electronic message includes a subject line indicating a request for contact information update as well as current contact information for the recipient in order to allow the recipient to indicate for convenience that no change has occurred when this is the case. There are a number of possible responses that the server may receive in step 324, and each is detailed below.

A first possible response is as follows: the transmission may fail and result in an undeliverable electronic message. This denoted as the "Transmission Failed" outcome path from step 324. In these cases, it is evident that either the contact information used is no longer current or the failed message delivery was caused by a temporary system or network problem. Preferably, when a delivery error occurs the process triggers a request in step 329 for the electronic message to be re-sent. This achieved by returning the process to step 321 and allowing verification as to whether or not the failure was caused by a temporary problem. Upon determining that the failure was not caused by a temporary system problem through a predetermined number transmission resends, the contact is noted as invalid since it is evident that the contact information used is no longer current.

A second possible response "No Response" is as follows: the transmission is not responded to but no electronic message delivery failure is noted, in which case it is assumed that the contact information has been received and is correct. Of course, this is not necessarily the case, and optionally for important contacts, a follow up communication is initiated in step 330 to verify the information. From step 330 the process returns to step 321, wherein the contacting sequence repeats. Preferably, a request for client contact is provided after a predetermined number of consecutive occurrences of this possible response from a same contact.

Typically in the second case there is no reply received from the contact within some predetermined time period. In this case the contact has no method of automatically replying to the electronic message or perhaps an error has occurred during transmission. After a predetermined number of communications with no response the contact is notified, in step 333 that the contact is suspect. The indication prompts the user to take action and determine the problem with this contact information. Preferably, the indication is generated only after a predetermined number of contact list update attempts with no response. This allows the above noted assumption that the contact information is correct to be verified at intervals when no other data is received from the contact.

In the third case a response to the transmitted electronic message is received, "Response Received". The response is assumed to have been transmitted electronically from the contact to an electronic address of the user and as a result the contact is noted as valid. Upon receipt of the response on the user system, step 331, the message is interpreted and when contact information within the message has changed, the user system automatically updates the contact list with the changes in step 328. These changes in the contact information are then stored within the customer information database 300.

Advantageously, the contact information is only updated when the user requests an update, and as such, the user's information is not changed without their knowledge, but alternatively the information is updated without the user's knowledge.

In an embodiment, the user specifies at which time intervals to automatically update their contact information. In a properly functioning system with all of the contacts having a method of automatically responding to an update request the contact information is maintained at intervals sufficiently short to ensure that it is maintained most current at all times.

Clearly, such an embodiment would be obtrusive to each contact if a means for automatically replying is not supported. Also, when an automated reply process is available to each contact, the method is not obtrusive to the contacts and as such, is a convenient method for contact data update.

Figure 4:
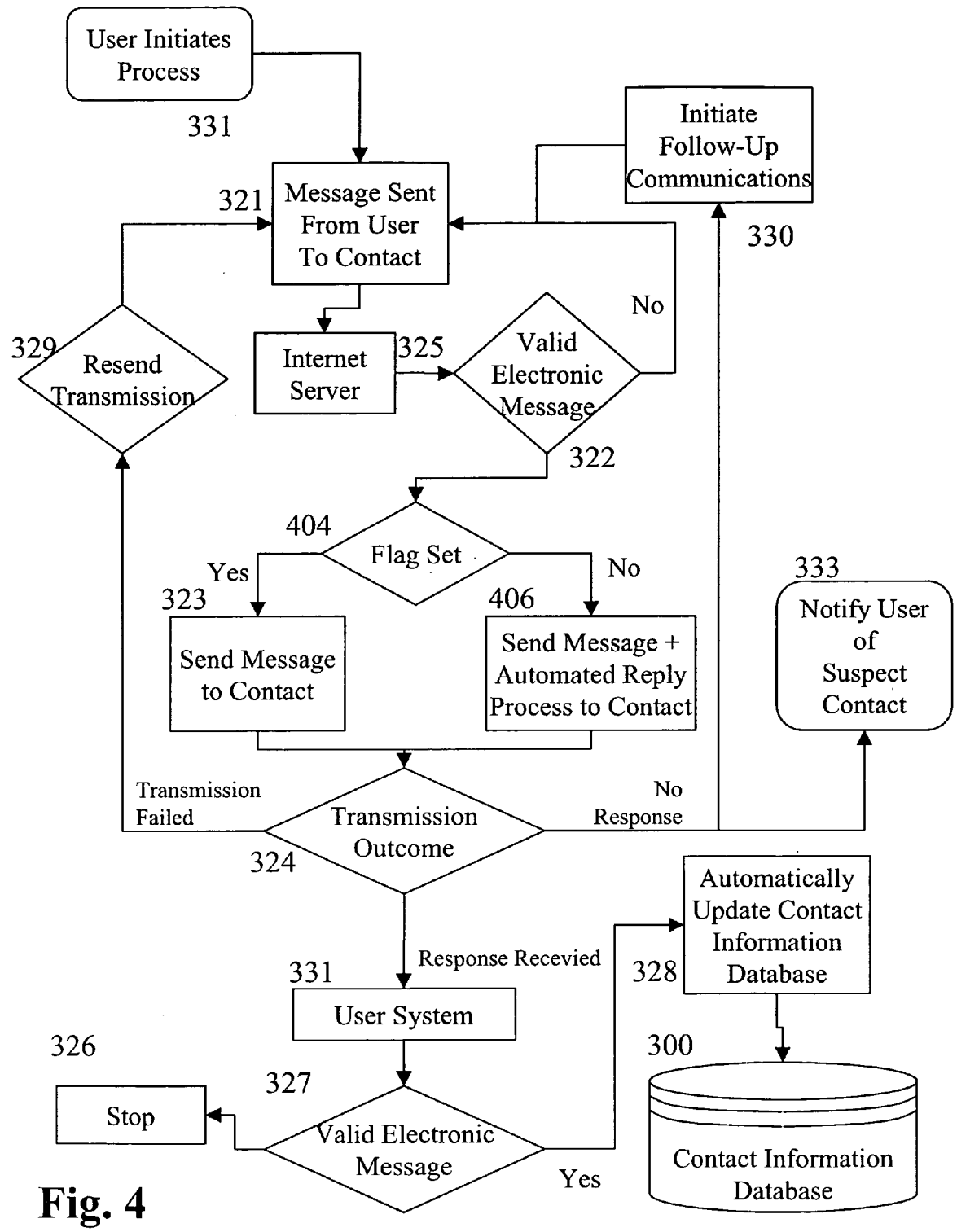
FIG. 4 presents an exemplary method of automatically replying to an update request according to an embodiment of the invention.

Referring to FIG. 4, a method of automatically replying to an update request is shown. For the purpose of automating the reply process, a first time a contact is contacted in accordance with the method of FIGS. 3A,B for updating of their contact information, attached to the electronic message is an automated reply process for installation within their system. This process is optionally installed on the system by the contact or another person. Of course, the contact, at their discretion, may choose not to install the automated reply process. Once installed, the automated reply process acts to intercept update request electronic messages received so as to prevent an individual from feeling inconvenienced by future update requests.

Upon installation of the automated reply process, an indication of such is provided to the user. Once such an indication is received, a flag is set on the user system indicating same. Optionally, future update requests are then transmitted at more frequent time intervals from the user to the contact since the automated reply process has been installed. Preferably these intervals are specifiable by the user.

In the exemplary flow of FIG. 4 the process step 323 of sending the message to the contact is preceded by a decision step 404 wherein a flag setting check establishes whether the message is sent in step 323 or whether the message is sent in conjunction with an automated reply process in step 406.

The contacts provide their contact information to the automated reply process through known input/output processes. For example, a window is provided with fill in boxes and the user fills in their contact information using a keyboard and a pointing device in the form of a mouse. The automated reply process stores the information, preferably in non-volatile storage, and upon intercepting an update request transmitted from the server, the automated reply process transmits the stored contact information to the server in a known format. Using a known format obviates a need to parse the received message since data is easily extractable based on the known format.

Figure 5:
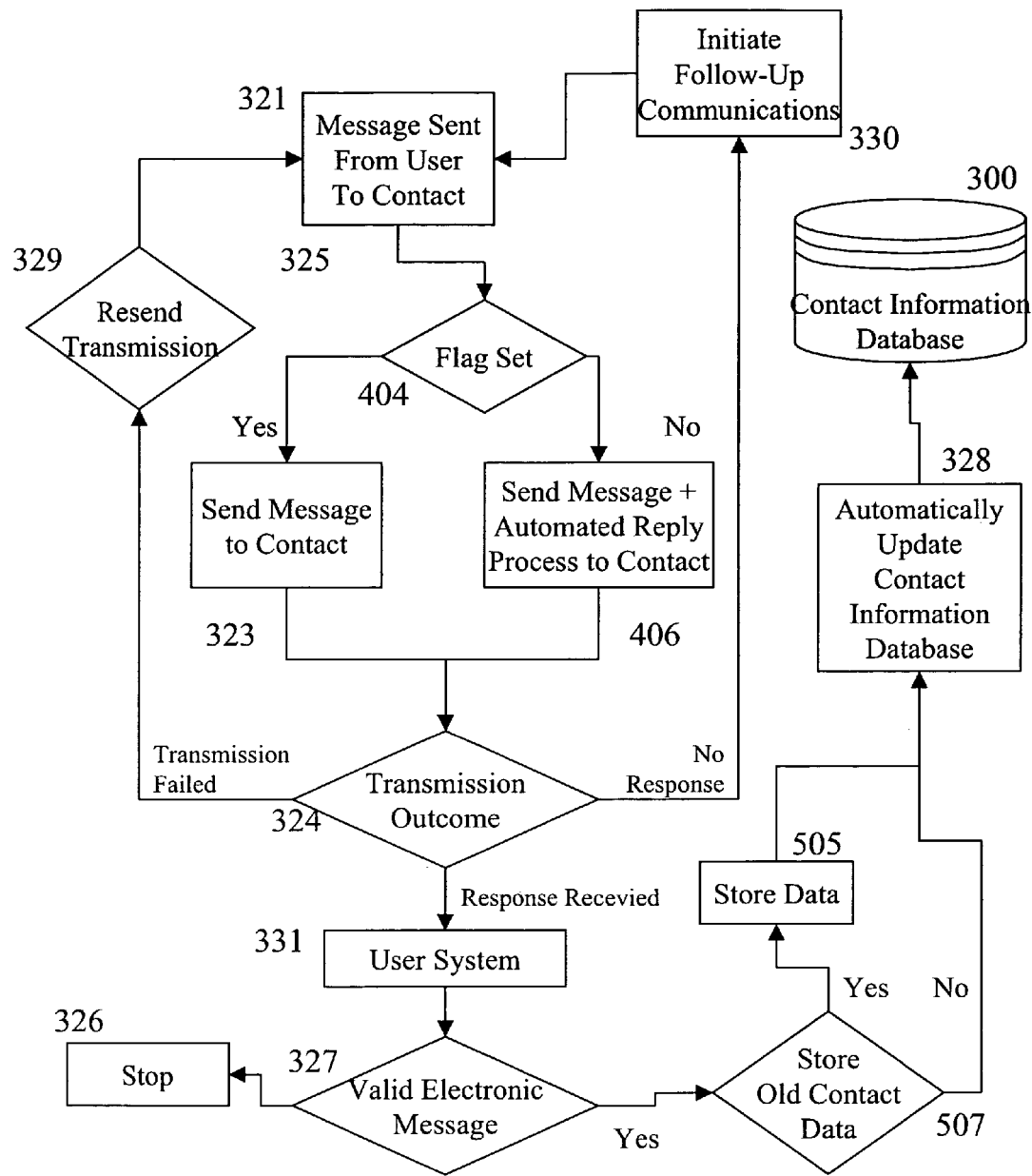
FIG. 5 shows an exemplary flow chart for updating the user contact database obviating the use of a server.

Referring to FIG. 5, a method of updating the user contact database is shown obviating the use of a server. A user system transmits electronic messages to systems associated with contacts contained in the user's contact list. Typically, the electronic messages are sent to an electronic address in the form of email message for each contact. The electronic messages request updated contact information. Here, a process similar to that described with reference to FIG. 4 is conducted but the user system acts as the server and automatically updates information stored therein. As such the Internet server step 325 and validity check 322 are omitted from the exemplary flow of FIG. 5. The user is notified of any new contact information changes requiring update on their electronic contact database through the above process. In the case when the contact list is stored on a personal digital assistant (PDA), upon connecting the PDA with the user system an option is available for updating the user contact list.

The exemplary flow of FIG. 5 differs from that of FIG. 4 as upon validity of the received electronic message being made in step 327 the user is prompted in step 507 with a request to store the old contact data alongside the new contact data. An affirmative response results in the process moving to step 505 wherein the old contact data is stored. Otherwise the process moves immediately to automatically updating the database in step 328.

Figure 6:
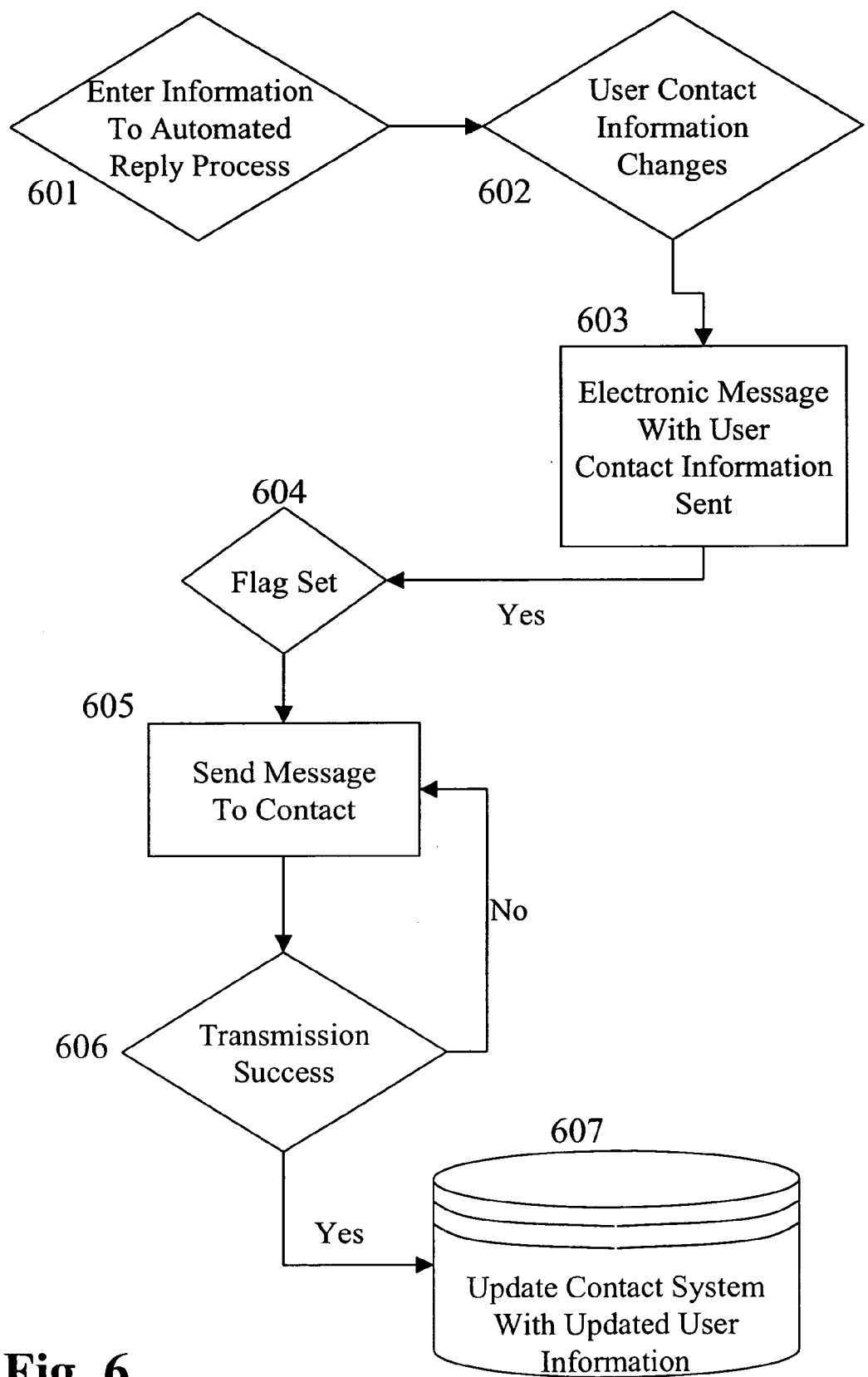
FIG. 6 presents an exemplary flow diagram for a contact having an automated reply process install updates whenever their contact information changes.

In FIG. 6 another embodiment of the invention is shown wherein the contact has an automated reply process installed. The contact enters their contact information initially in step 601, updates their contact information whenever it changes in step 602. In accordance with the method of FIG. 5, this is beneficial since it allows the automated reply process to reply automatically with updated contact information. Here, the automated reply process also, automatically, transmits the updated contact information to each contact within their contact list, step 603. This allows for each contact to maintain up to the minute contact information. Upon sending the electronic message in step 603 a flag is set in step 604, at which point the electronic message is actually sent from the users system in step 605 as opposed to simply being logged as sent in their electronic mail application in step 603.

Having sent the electronic message the system monitors subsequent electronic messages to determine in step 606 whether a successful transmission occurred. Detection of an error in transmission returns the process to step 603 for a further attempt at delivering the message. Detecting a successful transmission in step 606 results in the process moving to step 607 wherein the users contact management system is updated. Of course, when each contact has an automated reply process installed, the electronic message containing the updated contact information is intercepted and the contact database on the contact's system is automatically updated therewith. Thus, a user's system serves two separate but related functions of polling contacts to ensure accurate updated contact information and transmitting contact information updates relating to the user's contact information upon a change thereto. The installation of automated reply processes on each system ensures that the entire contact database update process is fully transparent to each user other than a need to enter the contact information when it changes.

In the above-described system a single user has an electronic contact list with a number of electronic addresses of contacts stored within the list. As more contacts are initiated the size of the user contact list increases. Since each contact is prompted to use the contact update system and since each contact has numerous other contacts, the system grows exponentially without requiring any contacts to use the system and without requiring subscription to a central server when a peer to peer contact update method is employed. Thus, beginning with a single user, communications to other users on their contact list and then users on their contact lists and so forth. As such, the system is self-advertising and self propagating. That said, the system is not like a virus since each individual to whom an update request message is sent has an option of inaction and the general system continues to function predictably. Thus, the overall system is always under the control of participating users.

In another embodiment the invention also has the capability to, over time, rebuild a user contact list, in the case when a user contact list is damaged. Having the auto reply process installed on the contact systems results in a periodic electronic message sent from other contact systems to the user system, each requesting an update of contact information. Receiving this message at the user system results in the automated reply process storing the contact electronic address of the contact in the user's contact list. At the time for automatic updating of contacts stored in the user's contact list, the automated reply process transmits an electronic message to the electronic address of all contacts stored within the user contact list. Receiving a reply message from this contact results in the contact information being stored under that contact profile in the user contact list. The user contact list now contains the contact information for one of the contacts, which had been previously lost. Over time, as more update requests are communicated between the contacts and the user, the auto reply process will also serve to rebuild the damaged user contact list.

Another embodiment of the invention also covers the exchange of more than contact information between a user system and a contact system. Typically, the automated reply process takes care of the updating of contact information for both user and contact systems. However, the auto reply process can also be used for the updating of other data, for instance electronic data files. The user indicates a filename they are looking for and inputs this filename into the input process of the automated reply process. The automated reply process sends out an electronic message from the user system to contact systems with message contents indicating a request for the specific file. On the contact system the automated reply process traps and interprets the incoming electronic message. In this case the message is requesting a specific electronic data file. There are two possible reply messages from the contact system. If the file is stored on the contact system then an electronic message with the attached file is transmitted via the automated reply process to the user system. Otherwise if the file was not found then a message indicative of such is sent to the user system. Clearly this form of information exchange between a user and their contacts is useful for sending more than just contact information update request messages. Preferably, a handshake is initiated when a file is found thereby allowing the originating system to select a source for the file when more than one system has a copy thereof. In this way, a single file is not transmitted from numerous other systems.

Advantageously no information about the contact is stored on any server and the contact information only resides on the systems of the contact or the user.

Numerous other embodiments may be envisioned without departing from the spirit or scope of the invention.

What is claimed is:

1. A method for updating an electronic contact information database comprising:
   a) transmitting a plurality of electronic mail messages, each electronic mail message transmitted to a contact destination of at least one contact of a plurality of contacts, and requesting in a human intelligible form updated contact information of the at least one contact, the contact information of the at least one contact being information for enabling contact with the at least one contact and being stored within the electronic contact information database; and
   b) receiving a return electronic mail message returned in response to the transmitting of at least one electronic mail message of the plurality of electronic mail messages and indicative of a change of the contact information of the at least one contact to which contact destination is transmitted the at least one electronic mail message; and
   c) automatically parsing the return electronic mail message for updated contact information, if any, to determine any changes in the updated contact information compared to contact information currently stored in the electronic contact information database and automatically updating the contact information database with any determined changes.

2. A method according to claim 1 wherein the human intelligible form in which each electronic message requests the updated contact information comprises the English language.

3. A method according to claim 1 wherein the return electronic mail message comprises a failure notice and an invalid destination address.

4. A method according to claim 1 wherein the plurality of electronic mail messages are substantially similar.

5. A method according to claim 4 wherein the plurality of electronic mail messages are automatically generated.

6. A method according to claim 1 wherein the plurality of electronic mail messages are automatically generated in dependence upon a template message.

7. A method according to claim 6 wherein each electronic mail message of the plurality of electronic mail messages comprises the contact information of the at least one contact to which contact destination is transmitted the electronic mail message, for display within a body of the electronic mail message.

8. A method according to claim 1 wherein the plurality of electronic mail messages is transmitted at intervals.

9. A method comprising:
   at intervals, generating in dependence upon a template a plurality of electronic mail messages, each electronic mail message for transmission to a contact destination of at least one contact of a plurality of contacts, and requesting in a human intelligible form updated contact information of the at least one contact, the contact information of the at least one contact being information for enabling contact with the at least one contact and being stored within the electronic contact information database; and
   automatically parsing a response, if any, to an electronic mail message of the plurality of electronic mail messages, for updated contact information to determine changes in the updated contact information compared to contact information currently stored in a contact information database.

10. A method according to claim 9 wherein each electronic mail message of the plurality of electronic mail messages comprises the contact information of the at least one contact to which contact destination is for transmission of the electronic mail message, for display within a body of the electronic mail message.

11. A method for updating an electronic contact information database comprising:
   providing to a computer of an individual, contact information relating to the individual and for enabling contact with the individual;
   storing the contact information relating to the individual within a storage medium of a system; and
   initiating a process between the system and another system for providing the contact information relating to the individual therebetween for use in updating contact information of one of the system and the another system, wherein the contact information is provided for automatic parsing for updated contact information to determine changes in the updated contact information compared to contact information currently stored.

12. A method according to claim 11 wherein the contact information is provided by the individual.

13. A method according to claim 11 wherein the contact the information is provided in response to a request therefor.

14. A method according to claim 13 wherein initiating comprises providing an email message.

15. A method according to claim 11 wherein the system comprises the computer.

16. A method according to claim 11 wherein the contact information is provided to each of a plurality of other systems during each of a plurality of processes.

* * * * *